Jan. 23, 1940.  H. W. UHLRIG  2,187,762
VENTILATING LOUVER FOR COOKING UTENSILS
Filed April 20, 1939
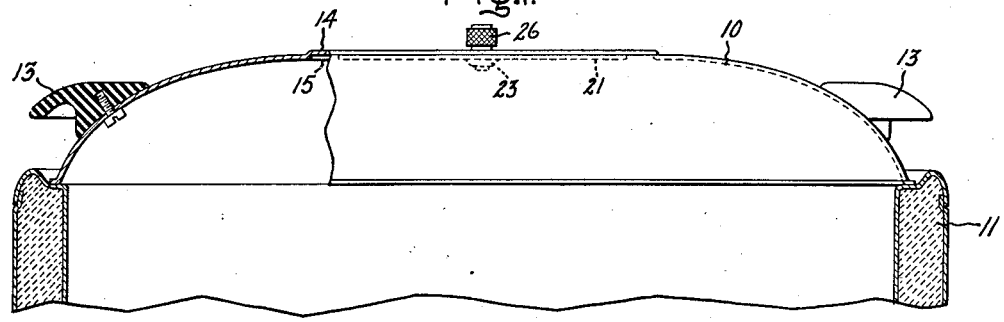
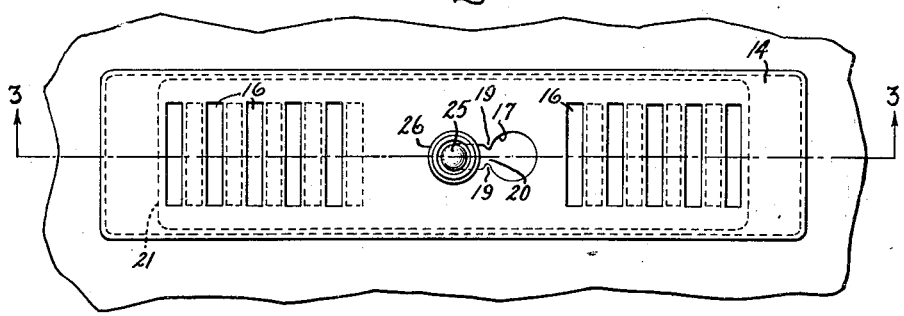
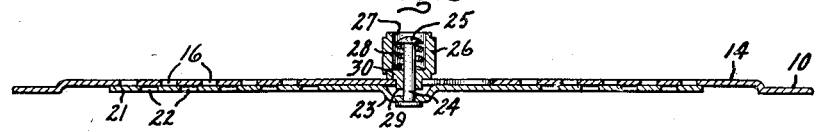
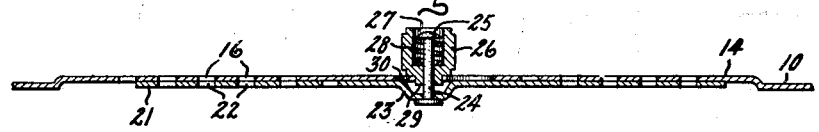
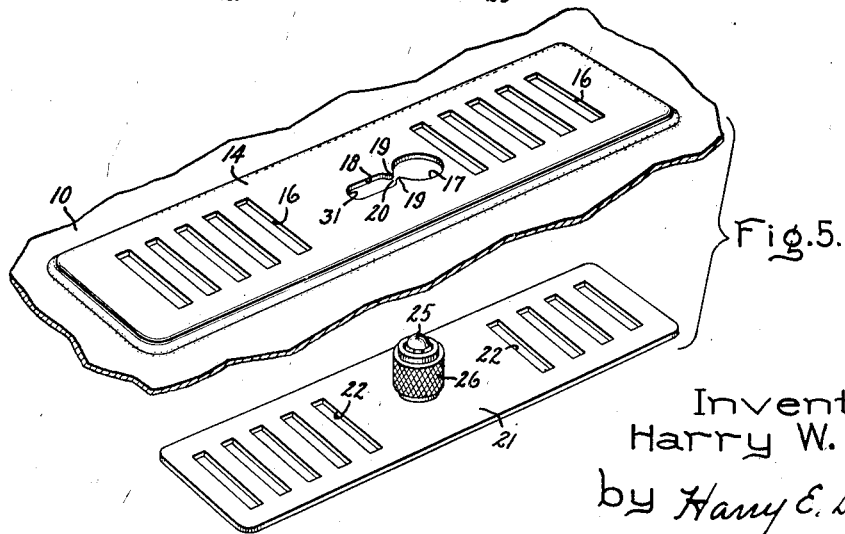
Inventor:
Harry W. Uhlrig,
by Harry E. Dunlavy
His Attorney.

Patented Jan. 23, 1940

2,187,762

UNITED STATES PATENT OFFICE 2,187,762

VENTILATING LOUVER FOR COOKING UTENSILS

Harry W. Uhlrig, Stratford, Conn., assignor to General Electric Company, a corporation of New York Application April 20, 1939, Serial No. 268,964

7 Claims. (Cl. 53—6)

My invention relates to cooking utensils and more particularly to a vent for the cover of a cooking utensil and has for one of its objects the provision in the cover of a utensil of a new and improved vent construction which may be manufactured at low cost.

It is a further object of my invention to provide a vent construction which may be readily and easily manipulated to vary the amount of opening of the vent between a fully opened position and a fully closed position.

It is a further object of my invention to provide a vent construction the component parts of which are positively held in assembled relation and have no tendency to fall apart but which may be moved to a position in which they are readily separable and may thereby be separately cleaned.

It is a further object of my invention to provide a vent construction the component parts of which will have an operative position and a separable position, means being provided to prevent the accidental movement of the parts from the operative position to the separable position thereby preventing the component parts from falling apart.

Additional objects and advantages of my invention will become apparent as the following description proceeds and the features of novelty which characterize my invention will be pointed out with particularity in the claims annexed to and forming a part of this specification.

For a more complete understanding of my invention, reference should be had to the accompanying drawing in which: Fig. 1 represents an elevation partly in section of a portion of a cooking utensil having a cover provided with my improved vent construction; Fig. 2 is an enlarged partial plan view of the cover illustrated in Fig. 1 and showing a plan view of my improved vent construction; Fig. 3 is a cross-section of my improved vent construction taken on the line 3—3 of Fig. 2; Fig. 4 is a view similar to Fig. 3 but showing the vent in its fully opened position; and Fig. 5 is a perspective view showing the component elements of my improved vent in the separated position.

Referring to Fig. 1, I have shown my invention as applied to a cover 10 adapted to rest upon the upper edge of a side wall or casing 11 (partially shown) of a cooking utensil. The portion of a cooking utensil shown represents the upper portion of an electric roaster but further details of the roaster have been omitted since they form no part of this invention. It is to be understood that while my invention will be described in detail as applied to the cover of an electric roaster, it is not intended to limit it thereto since it may be applied generally to covers of various types of cooking utensils.

Pressed into the cover 10 and in particular in the horizontal top wall portion thereof is a substantially rectangular shaped boss 14 defining a recess 15 extending longitudinally of the cover, and provided in the boss 14 are two groups of transversely extending parallel openings or slots 16. Arranged in the boss 14 between these two groups of slots 16 is a circular opening 17 and a relatively short longitudinally extending slot 18. As will appear more fully hereinafter, the slot 18 is utilized when the component parts of my improved vent construction are assembled in operative relation and the opening 17 is utilized when the component parts are being separated. The opening 17 and slot 18 are interconnected by a necked-down portion 19 which has a width less than the width of either the slot 17 or the opening 16 and forms a restricted passageway 20 between these two portions.

Arranged to be inserted in the recess 15 and to engage the underside of boss 14 is a substantially rectangular plate 21. Referring to Figs. 2 and 5, it will be observed that the width of the recess 15 formed by the boss 14 is slightly greater than the width of the plate 21. The recess 15 therefore forms a track confining the movement of the plate 21 to substantially longitudinal movement relative to the cover, the sides thereof preventing any turning of the plate 21 in the plane of the cover. Provided in the plate 21 are two groups of transversely extending slots 22 which are adapted to cooperate with the slots 16 provided in the cover portion and provided between the groups of slots 22 is a recess or depression 23 in which is mounted a handle which includes a central stem 24 riveted at one end to the plate 21 and provided at its opposite end with an enlarged head portion 25. Mounted on the stem 24 is a knob 26 which is arranged for vertical relative movement with respect to the stem and which is provided with a recess 27 adapted to receive the enlarged head 25. The outside diameter of the knob 26 is governed by the size of opening 17 in boss 14, the diameter being such as to permit the knob to be readily inserted in opening 17 when the component parts are being assembled or separated. Concentrically arranged about the stem 24 between the underside of the enlarged head 25 and the bottom of the recess 27 is a spring 28 which biases the knob downwardly toward the plate 21, as viewed in the drawing. Provided on the knob 26 adjacent the lower end thereof is a reduced portion 29 forming a shoulder 30 which is adapted to engage the upper surface of the boss 14 or cover 10 when the elements are in assembled relation. The diameter of the reduced portion 29 is governed by the width of slot 18 and the width of the opening 20 formed by necked-down portions 19, the diameter being small enough to permit the reduced portion to move freely in slot 18 and large enough to prevent movement thereof through opening 20 when the elements are in their operative relation.

In assembling my improved vent construction, the plate 21 is inserted in the recess 15 formed by the boss 14 so that the groups of slots in the plate and in the boss cooperate with each other. First, the knob 26 is inserted into and through the opening 17 which, as previously described, is of a diameter larger than the knob and permits the free and unobstructed movement of the knob thereinto. With the elements in this relation, the knob 26 is lifted vertically relative to the pin 24 and at the same time the plate is moved to the left as viewed in Fig. 2. With the knob 26 in its elevated position, the reduced portion 29 thereof is raised above the outer surface of the boss 14 and the pin 24 may readily pass through the opening 20 formed by the necked-down portions 19. When the pin 24 has been moved to the left beyond the necked-down portions 19, the knob is then released and it is moved downwardly relative to the stem 24 by the force exerted by spring 28 until the shoulder 30 engages the top surface of the boss 14 which also constitutes the upper surface of the cover 10, the reduced portion 29 moving freely into recess 18. It will be observed that by means of the spring 28 the shoulder 30 is firmly held against the upper surface of the boss 14 and the plate 21 is firmly held against the under surface thereof of the cover in the recess 15.

In operation, with the parts in their assembled relation the reduced portion 29 of the knob being located in the recess 18 in the manner just described, the plate 21 may be longitudinally moved in the boss 14, the limits of movement being fixed by the length of the recess 18 between its end 31 and the necked-down portions 19. In Fig. 3 is illustrated one relation between the groups of transversely extending slots 16 and 22. In the position shown, the knob 24 is moved to the left as far as is permitted by the end 31 of slot 18. In this position, the groups of slots 16 provided in the bosse 14 are completely covered by the portions of the plate 21 lying between the individual slots of each group of slots 22 and the vent is completely closed. In Fig. 4, the knob 26 is shown moved to its extreme righthand position which is limited by the necked-down portions 19. In this position it will be observed that the individual slots in each group of slots 22 lie directly under the individual slots of each group of slots 16 and the vent is in its fully opened position.

Any desired position of the vent between the fully closed and fully opened position may be readily obtained and by means of the engagement of the shoulder 30 on the upper surface of the boss 14 and under the influence of the force exerted by spring 28. the position which is selected for the vent will be positively maintained even though the cover is subjected to severe jars incident to its removal from and its application to the utensil. It will thus be observed that by means of my invention I have provided a simple ventilating construction which may be arranged in an infinite number of positions between fully opened and fully closed and which is positively maintained in each of its adjusted positions without the aid of fixed studs or similar devices. It will also be observed that, by providing a necked-down portion 19 between the slot 18 and the opening 17 and having its width only sufficient to permit the passage of the stem 24 therethrough, the knob is latched or locked in the recess 18 and cannot accidentally be moved into alignment with opening 17 and drop therethrough causing the elements to fall apart.

In detaching the plate 21 from the cover 12 for cleaning purposes, with the elements assembled as shown in Figs. 2, 3 or 4, the knob 26 is raised relative to the stem 24 a sufficient amount to permit the portion 29 to ride over the necked-down portion 19. The entire unit is then moved to the right, as viewed in Fig. 2, until the knob 26 lies over the opening 17. The member 21 and its associated handle is then in a position to drop out of engagement with the boss and both portions of the vent construction may be readily and separately cleaned.

While I have shown a particular embodiment of my invention, it will be understood that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. In combination, a cover for a cooking utensil having a plurality of openings therein, a substantially rectangular plate having a plurality of groups of openings adapted to cooperate with said openings in said cover, a knob movably mounted on said plate for relative vertical movement with respect thereto, means for detachably mounting said plate on said cover and means for slidably mounting said plate on said cover so that said openings in said cover and in said plate may be moved into and out of alignment to form a ventilating opening of a variable amount, and means interconnecting said two last mentioned means so that said plate may be moved from its detachable position to its slidable position or from its slidable position to its detachable position only when said knob is vertically moved relative to said plate.

2. In a cover for a cooking utensil, a substantially rectangular shaped boss pressed therein defining a substantially rectangular shaped recess and having a plurality of groups of openings arranged therein, a rectangular shaped plate having a width slightly less than the width of said recess and having a plurality of groups of openings adapted to cooperate with the openings in said boss to form a ventilating opening of variable size in said cover, said plate constructed and arranged to be removably and slidably mounted in said recess, the side walls of said recess confining the movement of said plate to substantially longitudinal movement relative to said recess.

3. In combination, a cover for a cooking utensil having a substantially rectangular shaped recess and a plurality of groups of parallel slots extending transversely of said recess. a substantially rectangular shaped plate having a width less than the width of said recess and having a plurality of groups of transversely extending slots adapted to cooperate with said slots in said cover to form a ventilating opening of variable size, a knob mounted on said plate and arranged for limited relative movement with respect thereto, means for detachably mounting said plate in said recess formed in said cover, said means comprising walls defining an opening in said cover between said groups of slots, said opening having a diameter sufficient to permit the unobstructed passage thereinto of said knob, and means for slidably moving said plate longitudinally in said recess so as to cause said slots in said cover and in said plate to be moved into and out of alignment, said means comprising a portion of reduced diameter on said knob and walls defining a longitudinally extending slot adjacent said opening in said cover having a width sufficient to permit the unobstructed movement of said reduced portion therein.

4. In combination, a cover for a cooking utensil having a plurality of groups of transversely extending parallel slots, a substantially rectangular plate having a plurality of groups of transversely extending slots adapted to cooperate with said slots in said cover, a knob mounted on said plate so as to be movable vertically relative thereto, a portion of reduced diameter on said knob, walls defining an opening in said cover between said groups of slots therein, said opening having a diameter sufficient to permit the unobstructed passage therethrough of said knob to form a detachable connection between said plate and said cover, walls defining a longitudinally extending slot adjacent said opening in said cover, said slot having a width sufficient to permit the unobstructed movement of said reduced portion of said knob therein to form a slidable connection between said plate and said cover so that said slots in said cover and in said plate may be moved into and out of alignment to form a ventilating opening of a variable amount, and means interconnecting said slot and said opening in said cover whereby said plate may be moved from the position in which it is detachable from said cover to the position in which it is slidable relative to said cover only when said knob is moved vertically upward with respect to said plate.

5. In a cooking utensil, a cover therefor having a plurality of openings therein to form a ventilating louver, a plate movably and detachably mounted on said cover and having a plurality of openings therein adapted to cooperate with said openings in said cover to vary the extent of the ventilating opening between a fully closed position and a fully opened position, a knob movably mounted on said plate and having a portion of reduced diameter adjacent the lower end thereof, said cover having an opening therein, the diameter of said opening being sufficient to permit the unobstructed passage of said knob thereinto so that said plate may be detached from said cover when said knob and said opening are in alignment, said cover also having a slot adjacent said opening of a width sufficient to permit said reduced portion of said knob to be freely moved therein, said slot in said cover having a length sufficient to permit said plate to be moved relative to said cover so that said ventilating opening is adjustable between a fully opened and a fully closed position, means interconnecting said slot and said opening in said cover and forming an opening having a width less than the diameter of said reduced portion on said knob to positively separate the operating position of said plate and said cover from the detachable position thereof, and means for moving said knob vertically relative to said plate whereby the lower end thereof may be raised above the upper surface of said cover at said interconnection between said slot and said opening to permit the movement of said knob out of said slot and into alignment with said opening whereby said plate may be detached from said cover.

6. In a ventilating louver arrangement for a cooking utensil, a cover for said utensil having a plurality of openings therein, a plate detachably connected to said cover and having a plurality of openings therein arranged to cooperate with said openings in said cover so that said openings in said cover are covered and uncovered by sliding movement of said plate, a stem mounted on said plate, a knob mounted on said stem and movable vertically relative thereto, a portion of reduced diameter on said knob forming a shoulder, said cover having a circular opening adapted to receive said knob to effect said detachable connection between said plate and said cover and also having a longitudinally extending slot of sufficient width to receive said portion of said knob of reduced diameter to effect limited sliding movement between said plate and said cover, a necked-down portion forming a passageway between said opening and said slot and having a width greater than said stem but less than said reduced portion of said knob whereby movement through said passageway resulting in movement of said plate from its slidable position to its detachable position or from its detachable position to its slidable position may be effected only when said knob is moved outwardly relative to said stem an amount sufficient to permit the end of said knob to pass over said necked-down portion, and resilient means arranged between said stem and said knob and adapted to force said knob toward said cover so that said shoulder engages the upper surface of said cover to maintain said plate in one of its slidably adjustable positions.

7. In a cover for a cooking utensil, a boss pressed therein defining a substantially rectangular shaped recess and having provided therein a plurality of groups of transversely extending parallel slots, a substantially circular opening and a longitudinally extending slot arranged between said groups of slots and a necked-down portion interconnecting said longitudinal slot and said opening and having a width less than either said slot or said opening, a plate adapted to be removably and slidably mounted in said recess and having a plurality of groups of transversely extending parallel slots arranged to cooperate with said groups of slots in said boss to form ventilating openings of variable size when said plate is slidably mounted in said recess, a stem mounted on said plate, a knob mounted on said stem so as to be movable vertically relative thereto, said knob having a diameter less than the diameter of said opening in said cover to effect said removable mounting of said plate on said cover, and a reduced portion on said knob having a diameter less than the width of said longitudinal slot and greater than the opening formed by said necked-down portions to effect in cooperation with said longitudinal slot said slidable mounting of said plate, said stem having a diameter less than the width of the opening formed by said necked-down portion so that said plate may be shifted from said slidable mounting position to said removable mounting position when said knob is elevated so that the end thereof rides over the surface of said boss at said necked-down portion.

HARRY W. UHLRIG.